(12) United States Patent  (10) Patent No.: US 8,719,396 B2
Brindley et al.  (45) Date of Patent: May 6, 2014

(54) FRAUD PREVENTION AND DETECTION FOR ONLINE ADVERTISING

(75) Inventors: Richard Brindley, Chesham (GB); Toby Doig, New Barnet (GB)

(73) Assignee: Vibrant Media Limited, London (GB)

( * ) Notice: Subject to any disclaimer, the term of this patent is extended or adjusted under 35 U.S.C. 154(b) by 1094 days.

(21) Appl. No.: 11/295,754

(22) Filed: Dec. 6, 2005

(65) Prior Publication Data

US 2006/0265493 A1  Nov. 23, 2006

Related U.S. Application Data

(60) Provisional application No. 60/683,437, filed on May 20, 2005.

(51) Int. Cl.
*G06F 15/173* (2006.01)
(52) U.S. Cl.
USPC .......................................... 709/224
(58) Field of Classification Search
USPC ................. 705/14, 26, 35, 10, 44, 40, 39, 75; 709/224, 217, 203, 219; 707/3, 104.1, 707/E17.109, E17.108, E17.112; 715/854, 715/201, 205, 839, 745
See application file for complete search history.

(56) References Cited

U.S. PATENT DOCUMENTS

| | | | |
|---|---|---|---|
| 5,204,947 A | 4/1993 | Bernstein et al. |
| 5,251,294 A | 10/1993 | Abelow |
| 5,694,594 A | 12/1997 | Chang |
| 5,708,825 A | 1/1998 | Sotomayor |
| 5,794,210 A | 8/1998 | Goldhaber et al. |
| 5,794,257 A | 8/1998 | Liu et al. |
| 5,815,830 A | 9/1998 | Anthony |
| 5,822,539 A | 10/1998 | Van Hoff |
| 5,822,720 A | 10/1998 | Bookman et al. |
| 5,848,396 A | 12/1998 | Gerace |
| 5,848,397 A | 12/1998 | Marsh et al. |

(Continued)

FOREIGN PATENT DOCUMENTS

| | | |
|---|---|---|
| EP | 0 778 534 | 6/1997 |
| EP | 8 222 535 A2 | 2/1998 |

(Continued)

OTHER PUBLICATIONS

PCT International Search Report and Written Opinion, PCT/IB2006/004285, Feb. 15, 2008, 13 pages.
Irwin, T. et al., "ValueClick to Launch Predictive Behavioral Targeting," Jul. 21, 2008, [online] [Retrieved on Aug. 14, 2008] Retrieved from the Internet<URL:http://www.mediapost.com/publications/?fa=Articles.san&s=86905&Nid=45235&p=118697>.
European Examination Report, EP 06851098.1, Dec. 29, 2008, 6 pages.

(Continued)

*Primary Examiner* — Asad Nawaz
*Assistant Examiner* — Saad A Waqas
(74) *Attorney, Agent, or Firm* — Foley & Lardner LLP; Christopher J. McKenna (57) ABSTRACT

A system and a method are disclosed for detecting and preventing fraud in online advertising environments. In one embodiment, the system and process include a publisher with a web page with which an advertisement set and a unique request identifier are sent to a user browser when the user requests the web page. The unique request identifier is unique, publisher specific, advertisement specific, for a single instance. A database keeps track of the unique request identifier so that when a user "clicks" on a link to access an advertiser's web site, the unique request identifier associated with the advertisement can be checked against the unique request identifier in the database to determine whether the "click" was one that may be non-fraudulent or valid.

21 Claims, 5 Drawing Sheets

(56) References Cited

U.S. PATENT DOCUMENTS

| | | | |
|---|---|---|---|
| 5,857,181 A | 1/1999 | Augenbraun et al. | |
| 5,870,546 A * | 2/1999 | Kirsch | 709/205 |
| 5,903,889 A | 5/1999 | De La Huerga et al. | |
| 5,920,859 A | 7/1999 | Li | |
| 5,935,207 A * | 8/1999 | Logue et al. | 709/219 |
| 5,948,061 A | 9/1999 | Merriman et al. | |
| 5,963,205 A | 10/1999 | Sotomayor | |
| 5,991,735 A | 11/1999 | Gerace | |
| 5,991,809 A | 11/1999 | Kriegsman | |
| 5,999,912 A * | 12/1999 | Wodarz et al. | 705/14.61 |
| 6,052,730 A | 4/2000 | Felciano et al. | |
| 6,092,074 A | 7/2000 | Rodkin et al. | |
| 6,098,081 A | 8/2000 | Heidorn et al. | |
| 6,108,703 A | 8/2000 | Leighton et al. | |
| 6,119,098 A | 9/2000 | Guyot et al. | |
| 6,128,651 A * | 10/2000 | Cezar | 709/217 |
| 6,185,598 B1 | 2/2001 | Farber et al. | |
| 6,253,189 B1 | 6/2001 | Feezell et al. | |
| 6,256,631 B1 | 7/2001 | Malcolm | |
| 6,269,361 B1 | 7/2001 | Davis et al. | |
| 6,285,987 B1 | 9/2001 | Roth et al. | |
| 6,324,519 B1 | 11/2001 | Eldering | |
| 6,339,438 B1 * | 1/2002 | Bates et al. | 715/787 |
| 6,341,306 B1 | 1/2002 | Rosenschein et al. | |
| 6,393,443 B1 | 5/2002 | Rubin et al. | |
| 6,434,567 B1 | 8/2002 | De La Huerga | |
| 6,449,657 B2 | 9/2002 | Stanbach et al. | |
| 6,516,321 B1 | 2/2003 | De La Huerga | |
| 6,519,631 B1 | 2/2003 | Rosenschein et al. | |
| 6,574,644 B2 | 6/2003 | Hsu et al. | |
| 6,581,065 B1 | 6/2003 | Rodkin et al. | |
| 6,728,712 B1 | 4/2004 | Kelley et al. | |
| 6,748,385 B1 | 6/2004 | Rodkin et al. | |
| 6,804,659 B1 | 10/2004 | Graham et al. | |
| 6,928,452 B2 | 8/2005 | De La Huerga | |
| 7,076,743 B2 * | 7/2006 | Ingram et al. | 715/854 |
| 7,089,194 B1 | 8/2006 | Berstis et al. | |
| 7,130,861 B2 | 10/2006 | Bookman et al. | |
| 7,240,022 B1 | 7/2007 | Bistriceanu et al. | |
| 7,284,008 B2 | 10/2007 | Henkin et al. | |
| 7,287,279 B2 * | 10/2007 | Bertman et al. | 726/23 |
| 7,437,725 B1 | 10/2008 | Chang et al. | |
| 7,617,121 B1 | 11/2009 | DeMayo et al. | |
| 7,617,136 B1 * | 11/2009 | Lessing et al. | 705/28 |
| 7,822,743 B2 | 10/2010 | Henkin et al. | |
| 7,933,893 B2 | 4/2011 | Walker et al. | |
| 7,949,791 B2 | 5/2011 | Serena | |
| 8,036,990 B1 | 10/2011 | Mir et al. | |
| 8,041,711 B2 | 10/2011 | Walker et al. | |
| 8,170,956 B1 | 5/2012 | Mir et al. | |
| 2002/0010757 A1 | 1/2002 | Granik et al. | |
| 2002/0026472 A1 | 2/2002 | Wolfman et al. | |
| 2003/0009562 A1 * | 1/2003 | Heymann et al. | 709/227 |
| 2003/0110210 A1 | 6/2003 | Nolan et al. | |
| 2004/0153365 A1 * | 8/2004 | Schneider et al. | 705/14 |
| 2004/0190457 A1 * | 9/2004 | Mohr | 370/241 |
| 2005/0080685 A1 * | 4/2005 | Blum | 705/26 |
| 2006/0069763 A1 * | 3/2006 | Kido | 709/223 |
| 2006/0155756 A1 * | 7/2006 | Stanev et al. | 707/103 R |
| 2006/0227364 A1 * | 10/2006 | Frank et al. | 358/1.15 |
| 2007/0033102 A1 * | 2/2007 | Frank et al. | 705/14 |
| 2009/0031311 A1 | 1/2009 | Chang et al. | |
| 2009/0171750 A1 | 7/2009 | Zhou et al. | |
| 2009/0171751 A1 | 7/2009 | Zhou et al. | |
| 2009/0259927 A1 | 10/2009 | Fisher | |
| 2010/0057556 A1 * | 3/2010 | Rousso et al. | 705/14.44 |
| 2010/0169305 A1 * | 7/2010 | Patterson | 707/728 |

FOREIGN PATENT DOCUMENTS

| | | |
|---|---|---|
| WO | WO-99/39281 A2 | 8/1999 |
| WO | WO-00/38074 A1 | 6/2000 |
| WO | WO 01/37119 A2 | 5/2001 |
| WO | WO-01/40992 A2 | 6/2001 |
| WO | WO-01/44992 A1 | 6/2001 |
| WO | WO 01/80846 A2 | 11/2001 |
| WO | WO-02/19175 A2 | 3/2002 |

OTHER PUBLICATIONS

"Cisco Distributed Director," Posted Feb. 21, 1997, 16 pages, [Online] [Retrieved on Dec. 4, 1997] Retrieved from the Internet<URL:http://www.cisco.com/wart/public/751/distdir/dd__wp.htm>.

"The Best Way to Buy and Sell Web Advertising Space" Aaddzz Brokers Web Ad Space Sales Between Advertisers & Publishers, Copyright 1997, Information Access Technologies, Inc., 6 pages.

AccuWeather Press Release, GuruNet Adds Weather Updates and Forecasts to its Instant Information Service, GuruNet.com, Jan. 18, 2000 (2 pages).

AD:TECH San Francisco 2003 Exhibitor Profiles. Business Wire, Jun. 16, 2003. Retrieved from http://www.thefreelibrary.com/__/print/PrintArticle.aspx?id=103396098 (10 pages).

AD:TECH San Francisco 2005 Exhibitor Profiles. Business Wire, Apr. 21, 2005. Retrieved from http://www.thefreelibrary.com/__/print/PrintArticle.aspx?id=131793102 (12 pages).

AdAgent—Flycast Online Product Demo, retrieved on Feb. 6, 2012 from http://web.archive.org/web/19990218045529/http://www.flycast.com/demo/adagent/setup.html (5 pages).

AdForce User Guide, A Complete Guide to AdForce version 2.6, Copyright 1998, Adforce Inc (285 pages).

Agosti, M. et al., "Automatic Authoring and Construction of Hypermedia for Information Retrieval," Multimedia Systems, Feb. 1995, pp. 1-9, vol. 3, No. 1, Springer Berlin.

Aiello, Dave, GuruNet Can't Make it with Consumers, Changing Name to Atomica, CTDATA.com, Nov. 7, 2000. Retrieved from http://www.ctdata.com/interbiz/2000/11/07/0858224.html (3 pages).

Allan, J., "Automatic Hypertext Construction," Dissertation, Cornell University, Jan. 1995, 128 pg.

Bohner, Kate, Searching With Gurus, JagNotes.com, Oct. 10, 1999. Retrieved from http://web.archive.org/web/20000229105054/http://www.gurunet.com/press/991010__jagnotes/jagnotes.html (2 pages).

Botluk, Diana, A Review of Flyswat, ResearchWire, Dec. 1, 1999. Retrieved from http://www.llrx.com/node/106/print (4 pages).

Bowman, Lisa M., Company brings hyperlinks to new level, ZDNet News, Sep. 6, 1999. Retrieved from http://web.archive.org/web/20000520142218/http://gurunet.com/press/990906__zdnet/zdnet.html (1 page).

Broersma, Matthew, FlyCast no fish outta water, ZDNet, Nov. 14, 1997. Retrieved on Feb. 23, 2012 from http://www.zdnet.comlnews/flycast-no-fish-outta-water/97467 (2 pages).

Bruner, Rick E., Small networks chase per-click ad business: Aaddzz, ValueClick compete, Advertising Age, Sep. 8, 1997.

Carnes, Harley, GuruNet—today on Internet Minute., Internet Minute, Nov. 12, 1999. Retrieved from http://web.archive.org/web/20000816052442/http://www.gurunet.com/press/991112__internet__minute/internet__minute.html (1 page).

Carr, L., et al., "The Evolution of Hypertext Link Services," ACM Computing Surveys, Dec. 1999, vol. 31, No. 4, [Online] [Retrieved on Mar. 31, 2009] Retrieved from the internet<URL:http://www.cs.brown.ed u/memex/ACM__HypertextTestbed/papers/19.html>.

Chan, Tricia, GuruNet.com Launched First Instant Expert, Internet Wire, Sep. 14, 1999 (2 pages).

Chin, Gregory, A full-fledged reference library at the click of a mouse button, Epinions.com, Nov. 3, 1999. Retrieved from http://web.archive.org/web/20000229173847/http://www.gurunet.com/press/991103__epinions/epinions.htm (2 pages).

CMGI acquires uBid, The Ticker, NY Daily News, NYDailyNews.com, Feb. 11, 2000 http://articles.nydailynews.com/2000-02-11/news/18126370__1__cmgi-ubid-tcby-enterprises.

Collaborative Dictionaries in Wordbot, retrieved from internet on Mar. 13, 2012 at http://webarchive.org/web/19990508223232/http://www.wordbot.com/dictionaries.html (2 pages).

Crestani, F. et al., "A Case Study of Automatic Authoring: from a Textbook to a Hyper-Textbook," Submitted to Elsevier Preprint, Oct. 13, 1997, pp. 1-34.

(56) References Cited

OTHER PUBLICATIONS

DART Targeting Methodologies, DART for Publishers 11.0, Jun. 1, 2000, DoubleClick Inc (42 pages).
DART White Paper, Jun. 1999 (21 pages).
Dash, Anil, Gurunet and Pervasive Hyperlinking, ANIL DASH A blog about making culture, Sep. 10, 1999. Retrieved from http://dashes.com/anil/1999/09/gurunet-and-per.html (2 pages).
DoubleClick.net web site, which was archived by web.archive.org on or before Feb. 5, 1998 (65 pages).
Einstein, David, GuruNet—Not!, Forbes.com, Nov. 7, 2000 (2 pages).
Elliot, Matt, GuruNet, ZDNet Reviews, Oct. 28, 1999. Retrieved from http://web.archive.org/web/20000301003402/http://www.gurunet.com/press/991028_zdnet_review/zdnet_review2.html (2 pages).
European Examination Report dated Dec. 6, 2011 in European Patent Application No. 10164402.9.
Evangelista, Benny, Mystery links/New Web advertising tool gets results, draws criticism, San Francisco Chronicle, Jul. 30, 2001. Retrieved from http://articles.sfgate.com/2001-07-30/business/17609727_1_contextual-advertising-onlineadvertising-bmg-entertainment.
eZula and FortuneCity Partner to Give Users Access to the Hottest Development in Online Shopping, Business Wire, May 11, 2000. Retrieved from http://www.thefreelibrary.com/_/print/PrintArticle.aspx?id=62028183 (2 pages).
eZula Shifts the Internet Shopping Model. PR Newswire, May 3, 2000. Retrieved from http://www.thefreelibrary.com/_/print/PrintArticle.aspx?id=61875017 (2 pages).
eZula website archive, Oct. 31, 2004. Retrieved from http://web.archive.org/web/20001018022713/http://www.ezula.com/ on Oct. 24, 2011 (52 pages).
eZula, Inc. Announces Immediate Availability of TopText iLookup 2.0, PR Newswire, Oct. 15, 2001. Retrieved from http://www.thefreelibrary.com/_/print/PrintArticle.aspx?id=79121240 (2 pages).
eZula.com, General, ISPs and Loyalty Program Provider pages. Retrieved from http://www.ezula.com/solutions/Default.asp, 2000(8 pages).
Farmer, Melanie Austria, Engage Technologies to buy CMGI's Adsmart, Flycast, CNET News, Jan. 20, 2000. Retrieved on Feb. 23, 2012 from http://news.cnet.com/Engage-Technologies-to-buy-CMGIs-Adsmart,-Flycast/21 00-1017_3 . . . (3 pages).
Festa, Paul, GuruNet ditches its name and consumer focus, CNET News, Nov. 7, 2000. Retrieved from http://news.cnet.com/GuruNet-ditches-its-name-and-consumer-focus/2100-1023_3-248227.html (3 pages).
Festa, Paul, Search tools leave Web out of sight, CNET News, Jan. 22, 2000. Retrieved from http://news.cnet.com/2100-1023-235526.html (2 pages).
Flycast Website Archive—Nov. 28, 1999. Retrieved on Feb. 23 2012 from http://web.archive.org/web/19991128141745/http://www.flycast.com/advertisers/index.cfm (15 pages).
FlyCast Webste Archive—May 31, 1997. Retrieved on Feb. 23, 2012 from http://web.archive.org/web/19970531224709/http://www.flycast.com/ (29 pages).
FlyCast.com Press Release: FlyCast Communications Revolutionizes Online Media Buying, Feb. 24, 1997. Retrieved on Feb. 6, 2012 from http://web.archive.org/web/19980115214122/http://www.flycast.com/PR022497.htm (3 pages).
FlyCast.com Press Release: Flycast Introduces Next-Generation, Turnkey Web Advertising Solution for Buyers and Sellers, Nov. 17, 1997. Retrieved on Feb. 6, 2012 from http://web.archive.org/web/19980115212143/http://www.flycast.com/PR101797.htm (3 pages).
FlyCast.com Press Release: Flycast Partners With Accipiter, Art Technology Group, Bellcore, Clickover, Focalink, Intelligent Interactions, Netgravity, and Starpoint to Extend and Maximize Web Advertising Opportunity, Jun. 23, 1997. Retrieved on Feb. 6, 2012 from http://web.archive.org/web/19980115214043/http://www.flycast.com/PR062097.htm (5 pages).
Flyswat and ConsumerREVIEW.com Partner to Connect Online Shoppers to Product Enthusiast Reviews & Communities, Business Wire, Mar. 1, 2000. Retrieved from http://www.thefreelibrary.com/Flyswat and ConsumerREVIEW.com Partner to Connect Online Shoppers to . . . -a059672879 (3 pages).
Flyswat and Red Herring Partner to Provide OnlineInvestors With the Best Business Technology Information From Any WebPage, Business Wire, Nov. 30, 1999. Retrieved on Oct. 20, 2011, from http://www.allbusiness.com/media-telecommunications/internet-www/6770359-1.html%23.TqCvdWwTRJw.printfriendly (2 pages).
Flyswat Appoints Former Surf Monkey Executive as Marketing Chief, Advertising Age, Oct. 28, 1999. Retrieved Nov. 21, 2011 from http://adage.com/print/8016 (1 page).
Flyswat, Neoplanet Announce Distribution Agreement; Flyswat Featured as Exclusive Enhanced Navigation Service in NeoPlanet 5.1, Busniess Wire, Feb. 8, 2000. Retrieved from http://findarticles.com/p/articles/mi_m0EIN/is_2000_Feb_8/ai_59234519/ (2 pages).
Flyswat.com web site, which was archived by web.archive.org on or before Nov. 27, 1999 (48 pages).
Gilmore, Dan, GuruNet's intriguing Net journey, San Jose Mercury News, Sep. 4, 1999 (3 pages).
Golden, Keith. Welcome to Wordbot, retrieved from internet on Mar. 13, 2012 at http://web.archive.org/web/19991013082439/http://wordbot.com/wordbot-js.html (3 pages).
Golden, Keith. Wordbot Home Page, retrieved from internet on Mar. 13, 2012 at http://web.archive.org/web/19990430033130/http://www.wordbot.com/ (2 pages).
Goldszmidt,G. et al., "Load Distribution for Scalable Web Servers: Summer Olympics 1996—A Case Study," 10 pages.
Good, Robin, Gurunet—Contextual search tool, masternewmedia.org, Jul. 27, 2000. Retrieved from http://www.masternewmedia.org/2000/07/27/gurunet_contextual_search_tool.htm (3 pages).
GuruNet Press Release, GuruNet Instant Expert Among Prestigious Group Selected to Present at Upside Magazine's Launch!, Gurunet.com, Ocotber 13, 1999 (2 pages).
GuruNet Press Release, GuruNet Introduces Version 1.0, Adding New International Capabilities, gurunet.com, Mar. 13, 2000 (2 pages).
GuruNet Press Release, GuruNet Publisher to Support Custom Content, Gurunet.com, Feb. 7, 2000 (2 pages).
GuruNet Press Release, GuruNet Selected to Appear at the DEMO 2000 Conference, Gurunet.com, Jan. 31, 2000 92 pages).
GuruNet Press Release, GuruNet.com Launches First Instant Expert, Gurunet.com, Sep. 7, 1999 (2 pages).
GuruNet Press Release, Oingo Records a Monthly Increase of Over 300% in Search Traffic and Licenses Search Technology to GuruNet, gurunet.com, Feb. 3, 2000 (2 pages).
GuruNet Press Release, RealNames and GuruNet ease information access on the web with Internet Keywords, GuruNet.com, Oct. 26, 1999 (2 pages).
GuruNet website archive, Apr. 8, 2000. Retrieved on Jan. 4, 2012 from http://web.archive.org/web/20000408161239/http://www.gurunet.com/ (79 pages).
HighBeam Research, Flyswat 1.0, Jan. 1, 2000. Retrieved from http://www.highbeam.com/DocPrint.aspx?DocId=1G1:58469424 (1 pages).
Himowitz, Mike, Let GuruNet answer your questions, SunSpot, Sep. 27, 1999 (2 pages).
Holm, R., "A Trip Down Hypermedia Lane," Linux Gazette, May 2002, Issue 78, [Online] [Retrieved on Mar. 31, 2009] Retrieved from the Internet<URL:http://linuxgazette.net/issue78/holm.html>.
Hotchkiss, Gord, Gator and TopText Push the Legal Limits of Online Marketing, NetProfit, Sep. 28, 2001. Retrieved from http://www.searchengineposition.com/info/netprofit/gatortoptext.asp(3 pages).
IBM Research. The (unofficial) WBI Story, retrieved from internet on Mar. 21, 2012 at http://web.archive.org/web/20000829142605/http://www.almaden.ibm.com/cs/wbi/doc/SystemAdmin.html (62 pages).
Langheinrich, Marc, Unintrusive customization techniques for Web Advertising, Elsevier Science B.V., 1999, pp. 181-194.
Lewis, Peter H., Searches Where Less, Not More, Is Better, The New York Times, Sep. 30, 1999 (3 pages).

(56) References Cited

OTHER PUBLICATIONS

Li, Z. et al., "Hypermedia Links and Information Retrieval," Conference, Lancaster University, 1992, pp. 1-11.

Lifschitz, Ronny, High Tech Features: Atten-Shun!, Globes Arena, Sep. 8, 1999 (3 pages).

Luening, Erich. IBM harnesses Web data flow, CNET News, published Jun. 11, 1999 (3 pages) http://news.cnet.com/2100-1001-226995.html.

Macarlo, Inc. Internet Services, New Flyswat Tested on Windows 2000 Professional, Apr. 28, 2000. Retrieved from http://macarlo.com/flyswatneww2k2904.htm (7 pages).

Magid, Larry, GuruNet Thinks Different, Upside Today, Sep. 24, 1999 (1 page).

Magid, Lawrence J., Quick Reference is GuruNet's Defining Moment, L.A. Times, Sep. 27, 1999 (2 pages).

Maglio, Paul P. & Farrell, Stephen. LiveInfo: Adapting Web Experience by Customization and Annotation, A H 2000, LNCS 1892, pp. 144-154, 2000. Springer-Verlag Berlin Heidelberg 2000.

Mayfield, J. et al., "Snitch: Augmenting Hypertext Documents with a Semantic Net," International Journal of Intelligent and Cooperative Information Systems, 1993, pp. 1-17.

Moskowitz, Lisa, Zapper Aids With Searching Questions, PCWorld, Jun. 12, 2000. Retrieved from http://www.pcworld.com/article/17114/zapper_aids_with_searching_questions.html (3 pages).

Mossberg, Walter S., Cool Software Brings Meaning to Words on Computer Screen, Wall Street Journal, Sep. 9, 1999. Retrieved from http://web.archive.org/web/20000229031010/http://www.gurunet.com/press/990909_mossberg/mossberg.html (2 pages).

mySimon—Flyswat Browser Companion, 1999. Retrieved on May 16, 2004from http://web.archive.org/web/20000301151946/www.mysimon.com/consumer_resources/flyswat . . . (5 pages).

NBC Internet Inc., Annual Report (10-K) Results of Operations (excerpt), EDGAROnline, Mar. 29, 2001. Retrieved from http://sec.edgar-online.com/nbc-internet-inc/10-k-annual-report/2001/03/29/section11.aspx (8 pages).

NBCi buys Flyswat, ZDNet, Apr. 3, 2000. Retrieved on Dec. 19, 2011 from http://www.zdnet.com/news/nbci-buys-flyswat/106630 (3 pages).

NBCi.com "Quickclick" links, Retrieved from http://www.quicklink.com, 2000 (7 pages).

Needle, David, GuruNet Seeks to Define Simple, Easy Web Searching, TechWeek, Dec. 12, 1999 (3 pages).

Needleman, Rafe, More Like This, Redherring, Sep. 14, 1999 (1 page).

Neoplanet Features, Flyswat, Mar. 2, 2000. Retrieved on Dec. 19, 2011 from http://web.archive.org/web/20000302145214/http://www.neoplanet.com/intro/features/flyswat/index.html (1 page).

PCMAG.com, Flyswat, Oct. 17, 2000. Retrieved on Oct. 20, 2011 from http://www.pcmag.com/article/print/6780 (1 page).

Pitkow, James E., & Jones, R. Kipp, Supporting the Web: A Distributed Hyperlink Database System, Fifth International World Wide Web Conference, Paris, France, May 6-11, 1996.

Plotnikoff, David, Navigation tools help the Web traveler, San Jose Mercury News, Feb. 5, 2000. Retrieved from http://I27.0.0.1 : 1584 J/v1?catid=14287363&md5=ea36bI512OcdOc077218360f3dd6d7d6 (3 pages).

PR Newswire, NBCi to Acquire Flyswat, Inc. to Bring Content and E-Commerce Direct to User Desktops, Apr. 3, 2000. Retrieved from http://www.prnewswire.com/news-releases/nbci-to-acquire-flyswat-inc-to-bring-content-and-e-commerce-direct-to-user-desktops-72374337.html (3 pages).

QuickClick.com website archive, Apr. 2, 2001. Retrieved on Dec. 6, 2011 from http://web.archive.org/web/20010402070831/http://www.quickclick.com/ (29 pages).

Schloss, Robert J., Novel Business Uses of Independently Created Hyperlinks in the World Wide Web: Basic Mechanism and Examples, Proceedings of the 29th Annual Hawaii International Conference on System Sciences—1996.

Seidman, Robert, Call on the Guru?, Online Insider, Sep. 12, 1999. Retrieved from http://web.archive.org/web/20000531084458/http://gurunet.com/press/990912_online_insider/online_insider.html (1 page).

Serena, F. David, Advertising Replacement BUsiness Plan Synopsis Meta-Boycott, Jan. 3, 2000, (3 pages).

Skalbeck, Roger, An impressive "instant information service" software tool, Law Library Resource Echange, Oct. 15, 1999. Retrieved from http://web.archive.org/web/20000229122937/http://www.gurunet.com/press/991015_llrx/llrx.html (2 pages).

Spooner, John, New Online Ad Network, Aaddzz, to Launch, Adweek, Jul. 7, 1997 http://www.adweek.com (3 pages).

Spring, Tom, Latest Online Ad Gimmick: Hyperlinks, PCWorld, Aug. 3, 2001. Retrieved from http://www.pcworld.com/article/57064/latest_online_ad_gimmick_hyperlinks.html (2 pages).

Spring, Tom, Updated Flyswat Search Has Better Aim, PCWorld, Feb. 15, 2000. Retrieved from http://www.pcworld.com/article/15294/updated_flyswat_search_has_better_aim.html (1 page).

Thislewaite, P., "Automatic Construction and Management of Large Open Webs," Information Processing & Management, 1997, pp. 161-173, vol. 33, No. 2.

TUDogs Review, GuruNet—5 Dogs from TUDogs, Feb. 29, 2000. Retrieved from http://web.archive.org/web/20000229184436/http://www.gurunet.com/press/991001_tudogs_review/tudogs.html (1 page).

WBI Development Kit for Java: another alphaWorks technology, retrieved from internet on Mar. 21, 2012 at http://web.archive.org/web/20000817033338/http://www.alphaworks.ibm.com/tech/wbidk/ (3 pages).

Wildstrom, Stephen, Guru.net: A Dictionary Hot-Wired to the Net, Business Week Daily Briefing, Nov. 29, 1999. Retrieved from http://web.archive.org/web/20000304000848/http://www.businessweek.com/bwdaily/dnflash/nov1999/nf91129d.htm (1 page).

Williamson, Debra Aho, Online buying moves toward a virtual market, Advertising Age, Feb. 24, 1997 (5 pages).

www.aaddzz.com, Aaddzz Website Archive 1997, retrieved from http://web.archive.org (42 pages).

Zapper.com Press Release, New Technology Links Users, With One Click, to Exact Web Content & Services They Seek, Jun. 6, 2000. Retreieved from http://web.archive.org/web/200012081302/http://zapper.com/about/about_fr.html (3 pages).

Zapper.com Press Release, Software Developer Zapper TEchnologies Launches Product, Venture Wire, May 12, 2000. Retrieved from http://web.archive.org/web/200012081302/http://zapper.com/about/about_fr.html (1 page).

Zapper.com Press Release, Zapper Technologies, Inc. Develops Advanced New Interactive Engine Technology, May 11, 2000. Retrieved from http://web.archive.org/web/200012081302/http://zapper.com/about/about_fr.html (2 pages).

Zapper.com website archive, Jun. 19, 2000. Retrieved on Dec. 14, 2011 from http://web.archive.org/web/20000619125036/http://zapper.com/index.shtml (84 pages).

Zeff, Robbin & Aronson, Brad, "Advertising on the Internet", John Wiley & Sons, Inc., 2nd Ed., Aug. 2, 1999 (excerpt).

Barrett, Rob & Maglio, Paul. Web Intermediaries (WBI) poster, IBM Almaden Research Center, http://www.almaden.ibm.com/cs/wbi, Apr. 1998.

Can networks harness P2P for profit? Retrieved from http://www.zdnet.com/news/can-networks-harness-p2p-for-profit/117908?tag=search-results-rivers;item7 (5 pages). Aug. 2, 2001.

DART User Manual, www.doubleclick.net May 22, 2008 (75 pages).

Don't Eat the Yellow Links. Slashdot.org, Jul. 31, 2001, Retrieved from http://slashdot.org/story/01/07/31/2015216/dont-eat-the-yellow-links (1 page).

Technical Overview of Content Spider May 1, 2000 (4 pages).

TopText Screenshot of Active Reference Links, Retrieved from http://web.archive.org/web/20050714005628/http://www.ezula.com/TopText/Features.asp Jul. 14, 2005 (1 page).

Wagner, Fred C., "The Aaddzz Service is Closed", Oct. 1, 2004, Letter to Aaddzz customers posted at http://www.aaddzz.com/letter.html (2 pages).

\* cited by examiner

FRAUD PREVENTION AND DETECTION FOR ONLINE ADVERTISING

RELATED APPLICATION

This application claims a benefit of, and priority to, U.S. patent application Ser. No. 60/683,437, filed May 20, 2005, and titled "Fraud Detection and Prevention for Online Advertisements," the contents of which are herein incorporated by reference.

BACKGROUND OF THE INVENTION

1. Field of the Invention

The present invention generally relates to the field of online advertising, and more specifically, to fraud avoidance and/or detection for online advertisement.

2. Description of the Related Art

Conventional online advertising in the context of pay per click is known. A conventional set up includes a publisher that supplies web content on web pages and an advertiser that advertises on the web page. In this arrangement, an advertiser typically has a uniform resource locator (URL) link on the web page. An end user clicks on when that end user browses the publisher's web page if that end user is interested in the advertiser's link. For each click through, the advertiser pays the publisher some predetermined amount that may be purchased real time, on credit, or some other financial arrangement that pays on a per click or group of click basis.

A problem with such conventional online advertising is that it is susceptible to fraud. One example of fraud is referred to as competitive fraud. In competitive fraud a competitor (or other organization whose interests are not aligned with the advertiser) may harvest from a webpage click URL addresses of advertisers. Specifically, the competitor may employ individuals to click on the links of other advertisers on a web page so that those advertisers end up with a large financial bill to each advertiser with no associated sales for any of them, which results in financial loss.

Another problem with conventional online advertising is click fraud. In some advertising arrangements, a publisher may be paid on a per click basis for an advertisement so that each click on an advertiser's URL on a web page results in revenue for the publisher. With click fraud, to maximize revenue a publisher may employ individuals or technology such as bots to trigger click throughs on a web page. Again, this results in a large financial bill to the advertiser from the publisher and no associated sales for the advertiser, which results in financial loss.

Hence, there is a need for a system and a method for detecting and preventing fraud in online advertising environments to allow advertisers and publishers to track fraudulent conditions and take appropriate corrective action.

SUMMARY OF THE INVENTION

The present invention includes a system (and a method) for detecting and preventing fraud for online advertising. In one embodiment the system tracks activity associated with a web site. The system receives, from a requester, a request for information to supplement content on the web site. The request includes a unique request identifier and a publisher identifier. The system retrieves a unique information identifier. The unique information identifier includes information unique to the request for one instance. The system generates a unique request identifier. The unique request identifier includes the unique information identifier. The system transmits the unique request identifier to the requester and logs the unique request identifier and the publisher identifier in a database for later comparison.

Subsequently, the system receives the unique request identifier and the unique information identifier when information that was transmitted to the requester was selected by the requestor when the requestor is on the web site. Upon receipt of this information from the requestor, the system validates the unique information identifier and either logs it as valid or invalid. In particular, the system compares the received unique request identifier and the unique information identifier with the logged unique request identifier and the unique information identifier to determine if they were previously paired. If they were previously paired, the request is invalid and if not previously paired, the request is valid. If the unique information identifier is logged as invalid, the response is sent back to the requester indicating as such. If it is logged as valid, the system redirects the requester to a second URL in response to logging a valid unique information identifier.

An advantage of the present invention includes providing additional information, e.g., an advertisement, in a manner that includes an identifier of that information and the URL of the web site with which it is associated so that when that information is selected it can be paired (or matched) with stored identifier data to determine whether the selection is "valid." Thus, the information is verifiable, or auditable, for applications that would benefit from such data, for example, advertisement providers or purchasers associated with content on a web site. Such data would then be used to identify whether clicks on a web site are fraudulent due to activity from, for example, a click harvesting mechanism.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

Figure (FIG. 1)*a* illustrates one embodiment of a generational operational architecture for a fraud prevention and detection system.

DETAILED DESCRIPTION OF THE PREFERRED EMBODIMENTS

The Figures (FIGS.) and the following description relates to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles of the described herein.

For ease of discussion, embodiments of the system (or method) are described in the context of advertisement generation, for placement on a web page, and subsequent selection and reconciliation of that generated advertisement to determine whether such selection was a valid or invalid selection. It is noted that the principles disclosed herein are also applicable to other configurations that generate a specific instance of information, forward that information, allow selection of that information, and validate that information through a reconciliation process.

Figure 1A:
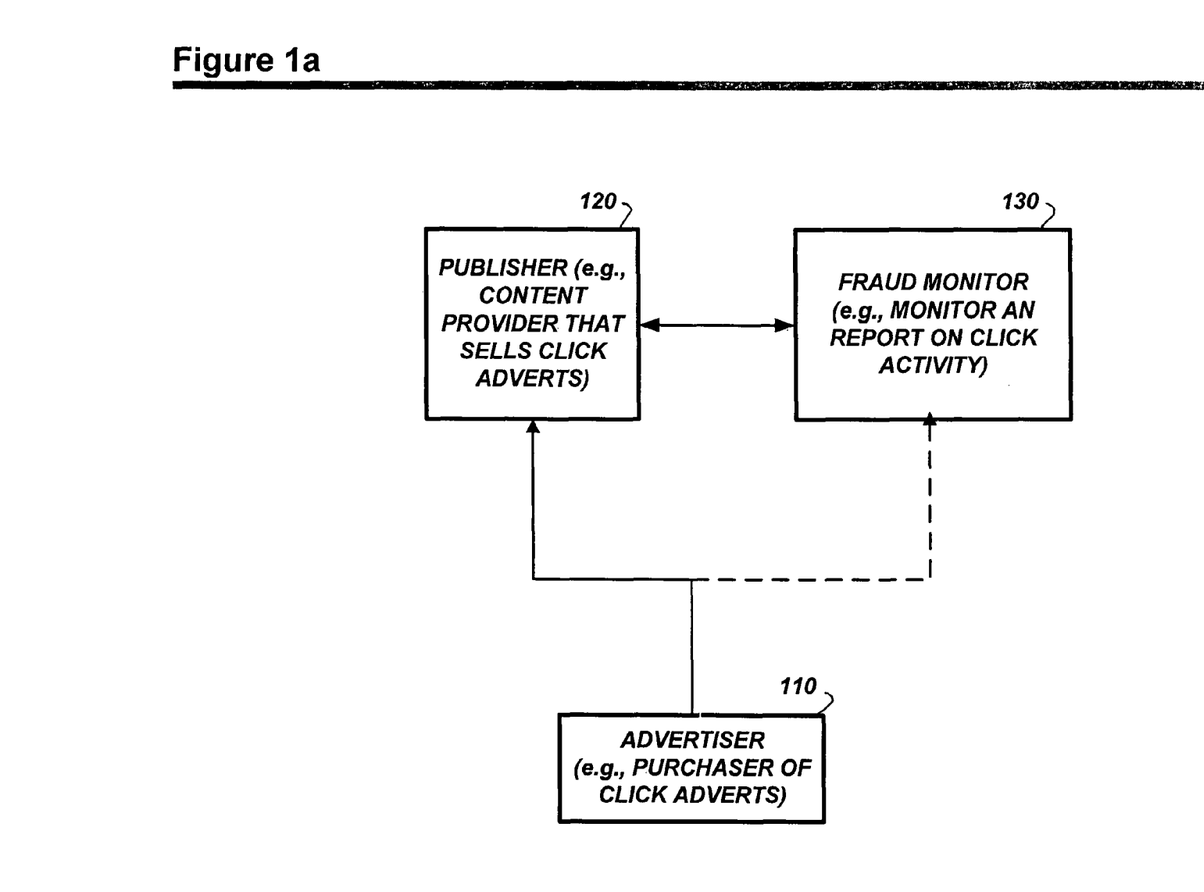

Referring now to FIG. 1a, it illustrates one embodiment of a general operational architecture for a fraud prevention and detection system. The architecture includes an advertiser 110, a publisher 120, and a fraud monitor 130. The advertiser 110 is configured to purchase click advertisements on a web page (or web site). The publisher 120 provides content on the web page and sells the click advertisements, e.g., to the advertiser 110. Typically, the publisher 120 sells the click advertisement to the advertiser 110 on a "per click" or per set of clicks basis. The publisher 110 logs each click (or selection) or each set of clicks (selections) on the web page to charge it back to the advertiser 110.

In one embodiment, the publisher 120 is a host or web server on the Internet. In such embodiments, the publisher 120 allows for the content to be accessed by a client computing system (client system, computer and/or site) through a browser (e.g., Microsoft® Internet Explorer or Mozilla Firefox) on the client system. Subsequently, a user at the client system may select one or more of the advertisements of the advertiser 110 on the publisher's web page by "clicking" on that advertisement. However, the advertisements of the advertiser 110 on the publisher's web page may be continuously selected over and over either accidentally or maliciously. Moreover, a computing mechanism such as a "bot" may be configured to continuously select the advertisement. In such instances, the advertiser 110 is charged a fee for each time the advertisement is selected. Thus, to combat such activity the fraud monitor 120 is configured within an embodiment of a system and a process to detect, report, and for/or prevent it.

The fraud monitor 130 is configured to monitor and report on click activity. Further, the fraud monitor 130 can be configured to generate advertisement sets that allow for subsequent reconciliation for monitoring (or auditing) when any of the advertisements in the set are selected. In one embodiment, selection of an advertisement can be reconciled as described herein, the selection is considered to be valid; else it is considered to be invalid. Thus, in one embodiment, the fraud monitor 130 may be configured as an advertisement generation and reconciliation system.

Figure 1B:
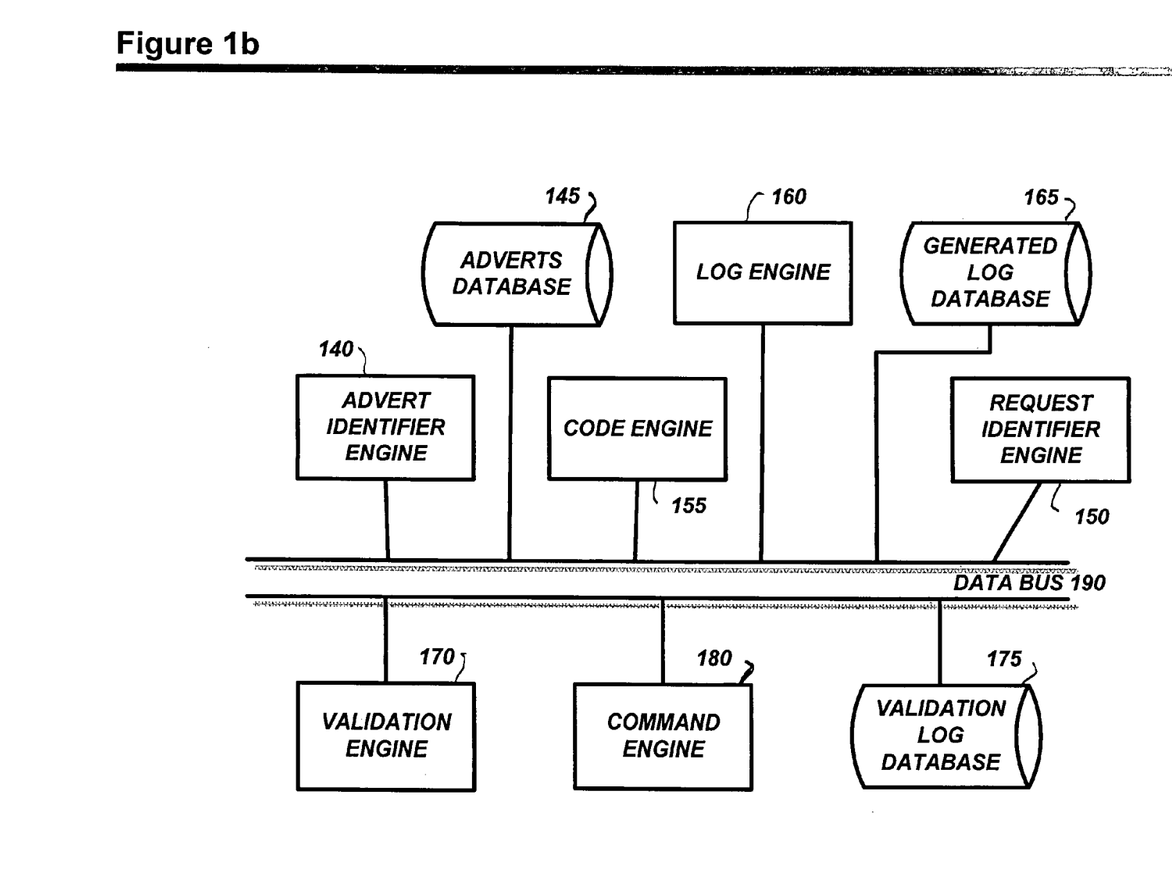
FIG. 1*b* illustrates one embodiment of an advertisement (advert) generation and reconciliation system.

FIG. 1b illustrates one embodiment of an advertisement (advert) generation and reconciliation system in accordance with the present invention. The advertisement generation and reconciliation system may be configured as a web server on a host (or server) side of a client-server processing configuration. The web server may be a configuration of one or more physical and/or logical computing machines configured to provide processing power, including processor(s), memory, storage, operating system, software for execution and the like.

The advertisement generation and reconciliation system includes an advertisement identifier engine 140, an advertisement database 145, a request identifier engine 150, a code (generation) engine 155, a log engine 160, a generated log database 165, a validation engine 170, a validation log database 175, and a command engine 180. These components are communicatively coupled together through a data bus 190. It is noted that the data bus 190 may be wired or wireless and that the communications coupling may be direct (e.g., physical) or indirect (e.g., logical). Operation of the components is further described with reference to FIGS. 2 through 4.

Figure 2:
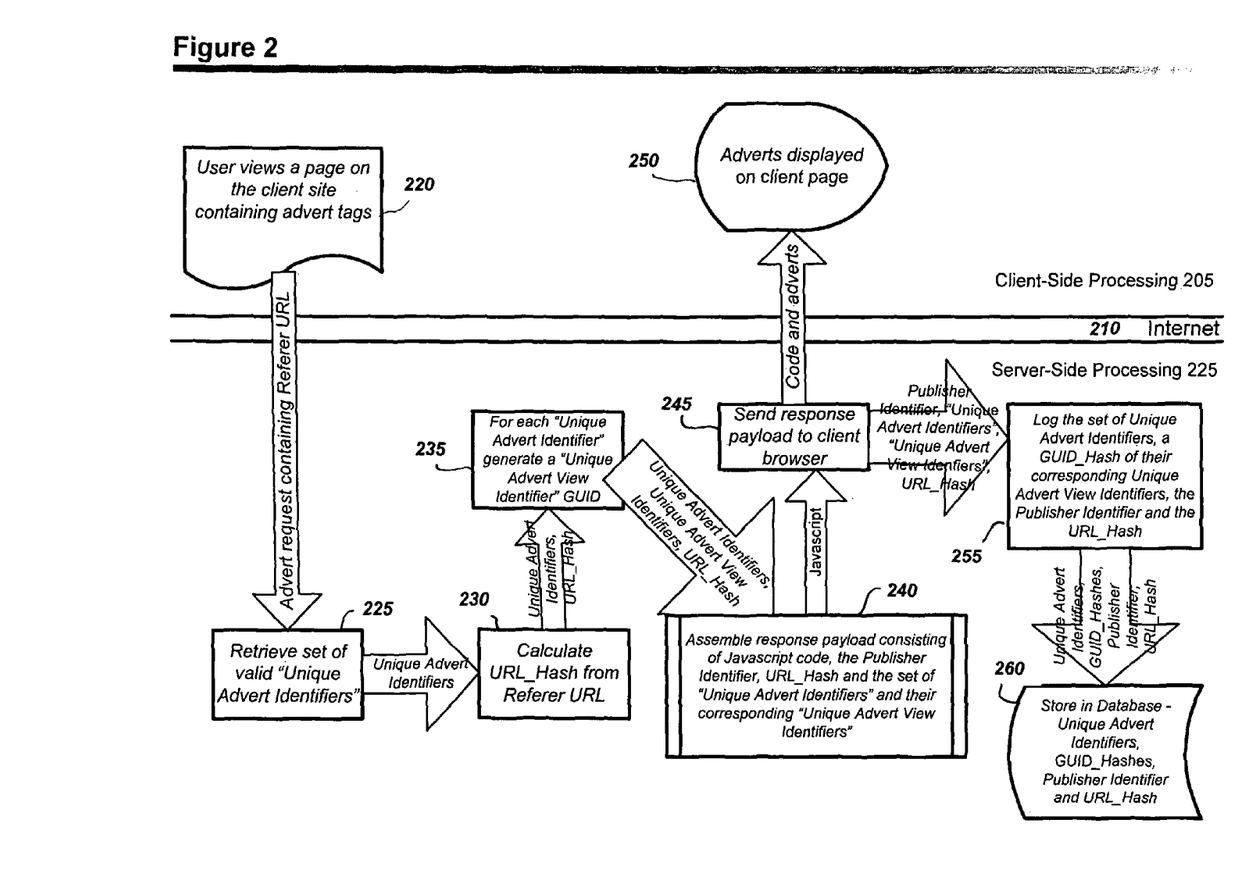
FIG. 2 illustrates one embodiment of a client-server interaction for advertisement (advert) generation.

Turning to FIG. 2, it illustrates one embodiment of a client-server interaction for advertisement generation in accordance with the present invention. The process configuration includes client-side processing 205 and server side processing 225 that are communicatively coupled through a communications medium, for example, the Internet 210 or an Intranet. In one embodiment, the client side processing 205 includes a client system that executes a web browser and the server side processing 225 includes one or more web servers configured to execute processes as further described below.

The illustrated process starts with a user viewing 220 a web page on a client system (e.g., a browser on a client computer). In the web page is an embedded advertising link (or links). The process continues with receipt of a request from the client system (e.g., user clicks on a link as the web page displayed in the browser) to serve the embedded advertising link as well as the uniform resource locator (URL) of the web page (referrer URL). Specifically, in one embodiment the client system forwards an identification of the publisher 120, or publisher identifier, to the web server to identify the publisher 120 web page (or site) into which the advertising link(s) are to be served.

When the web server receives the request, it determines through the advertisements identifier engine 140 which set of advertisements from the advertisement database 145 to return for display. The set of advertisements may be one advertisement or two or more advertisements. Each advertisement has a unique advertisement identifier that is also retrieved 225 from the advertisement database 145.

The process continues with calculating 230 a "URL_hash" of the referrer URL. As an example, the referrer URL is a URL an end user types into a browser in an attempt to access a web page at that URL address. The calculated 230 URL_hash is a one-way hash of the referrer URL of the web page into which the advertising link(s) are to be served. In addition, for each advertisement, the process generates 235 a unique advertisement view identifier. In one embodiment, the unique advertisement view identifier is a globally unique identifier (GUID), which can be a pseudo-random number generated to be unique for each unique web page and each unique advertisement identifier. The paired unique advertisement identifier and the unique advertisement view identifier provide a fingerprint for a single instance of the serving of a specific advertisement, which is later reconciled 420.

The process continues with the code engine 155 assembling 240 a response payload for the client system. The response payload comprises executable code, e.g., Javascript, that includes the publisher identifier, the URL_hash, the unique advertisement identifier, and a hash of the corresponding unique advertisement view identifier. The hash of the unique advertisement view identifier also may be referred to as a GUID_hash. Once assembled, the response payload is sent 245 by the web server to the client system.

The client system receives the executable code, which contains the publisher identifier, URL_hash, and the set of unique advertisement identifiers and corresponding unique advertisement view identifier pairs, along with the contents and format of the link (or links) to be displayed and a URL pointing to a click handling page, and displays 250 the appropriate advertisements therein on the web page in the browser. When a link is selected by a user (as further described herein) the browser on the client system can execute the executable code, redirect the browser to the URL pointing to the click handling page.

Note in one embodiment the process writes the publisher identifier, the URL_hash, the unique advertisement identifier, and a hash of the corresponding unique advertisement view identifier to database, e.g., a valid link table. The log engine 160 logs 255 this data for storage 260 in the generated log database 165 for later access. In addition, it is noted that the valid link table is periodically replicated to a back-end statistics server.

Figure 3:
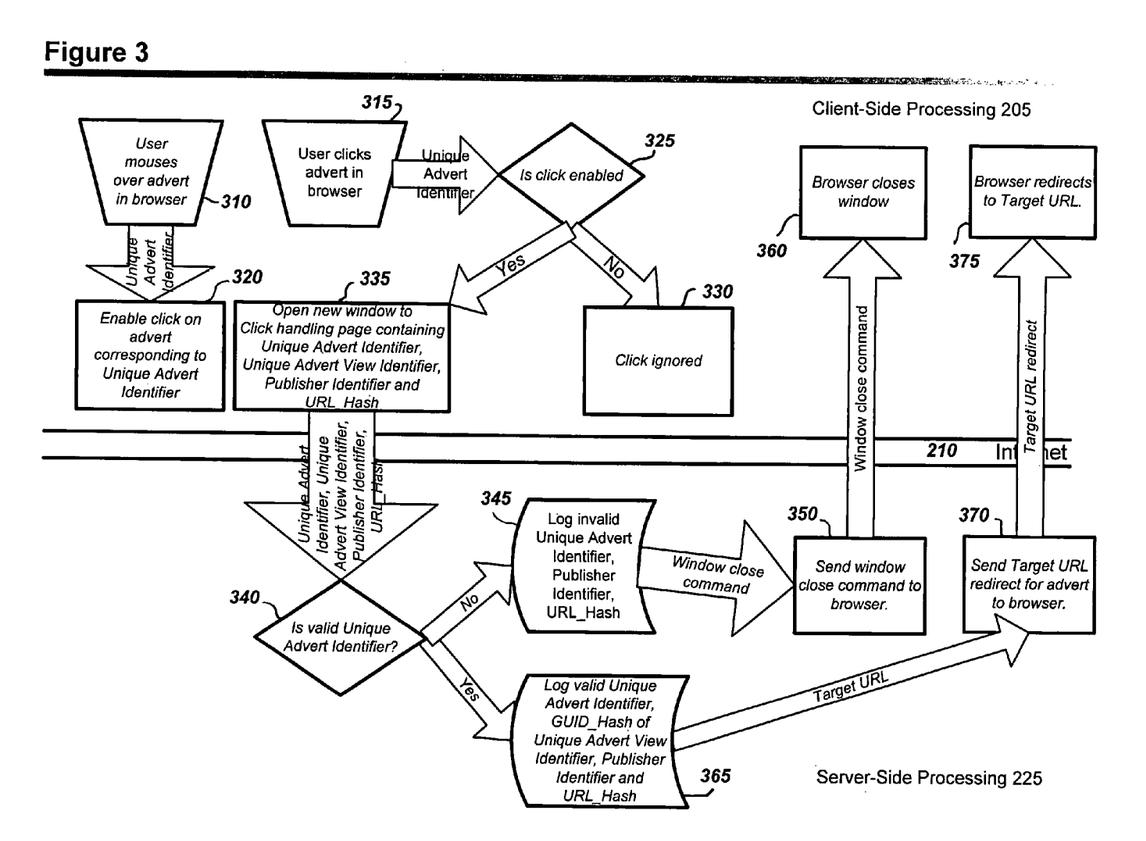
FIG. 3 illustrates one embodiment for advertisement presentation in a configuration as disclosed.

Turning to FIG. 3, it illustrates one embodiment of advertisement interaction in accordance with the present invention. Referring first to the client side processing 205, a process is executed in conjunction with the executable code received from the server side processing 225. Specifically, the process displays the link (or links) and asserts a mouse over 310 (e.g., OnMouseOver) and click (e.g., OnClick) event trap on each link. The mouse over 310 includes moving a pointing device (e.g., mouse, trackball, computing pen, etc.) cursor over a link (e.g., advertisement link) in the browser.

If the pointer over event fires (or triggers) the process enables 320 a click on advertisement corresponding to the unique advertisement identifier by setting the link to active and clickable by a status flag. When the user "clicks" (selects or triggers) 315, the advertisement link in the browser, the process determines 325 if the click has been enabled (i.e., a selection has been made). Specifically, if a click event fires (or triggers) the process checks to determine if the pointer over event has fired. If no click was enabled, the process ignores 330 the click and does nothing.

If the click event fires and the pointer over event has been fired, the process generates a destination URL containing the destination URL of the click handling page on the web server and a query string containing the unique advertisement identifier, the unique advertisement view identifier, the publisher identifier, the URL_hash. In one embodiment, the process opens 335 a new instance of the browser (a window or a tab) that targets the destination URL. In one embodiment, a user can observe this new instance of the browser beginning with a blank screen. The unique advertisement identifier, the unique advertisement view identifier, the publisher identifier, the URL_hash are sent from the browser to the web server on the server side processing 225.

On the server side processing 225, the web server receives the page call with information from the client side processing 205. The validation engine 170 in the web server looks up the unique advertisement identifier in its valid advertisement list to determine 340 if the advertisement is valid and to retrieve the valid advertisement destination URL. The process determines that the advertisement is valid by determining whether the unique advertisement identifier is valid. In one embodiment they are one-to-one linked. If the unique advertisement identifier is not valid, the process logs 345 the invalid unique advertisement identifier, the publisher identifier, and the URL_hash for storage in the validation log database 175. The command engine 180 then sends 350 a window (or tab) close command to the browser on the client system. This closes 360 the browser window on the client system.

If the advertisement is valid, the validation engine 170 logs 365 the valid unique advertisement identifier, the hash of the unique advertisement view identifier (GUID_hash), the publisher identifier, and the hash of the referrer URL (URL_hash) in the validation log database 175. It is noted that the validation log database 175 can be configured to function as a back end statistics database. The command engine 180 then sends 370 a command to the browser on the client system to redirect 375 the browser to the target URL, which is a valid advertisement destination URL.

In one embodiment, the process logs 365 the valid unique advertisement identifier as a "click token" that corresponds to the publisher identifier, the unique advertisement identifier, a hash of the unique advertisement view identifier (GUID_hash) and the hash of the referrer URL (URL_hash). Periodically, the table of "click tokens" is replicated to the validation log database 175 (e.g., a back-end statistics database).

Figure 4:
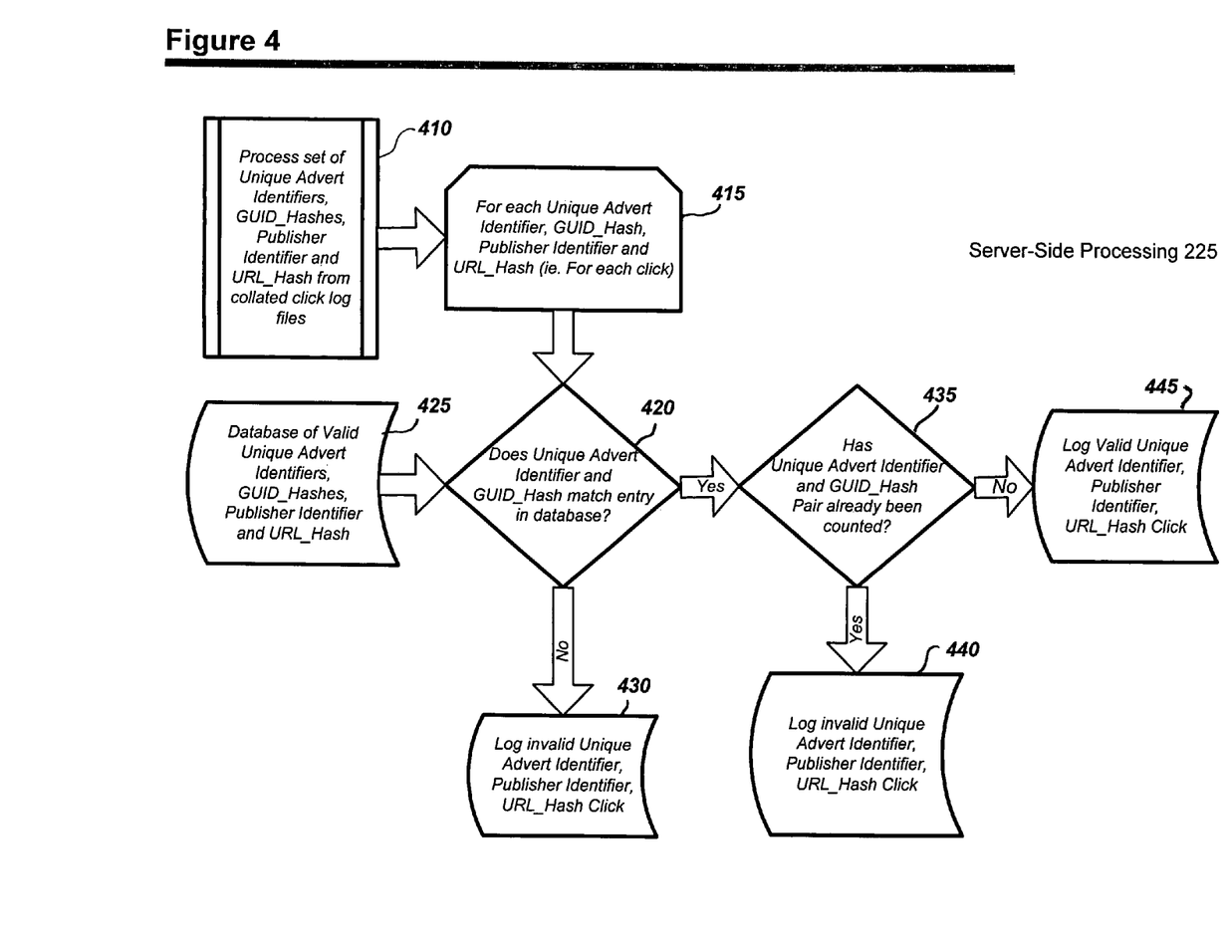
FIG. 4 illustrates one embodiment of click reconciliation in a configuration as disclosed.

The process of validating a unique advertisement identifier includes a reconciliation process that compares the data received from the browser on the client system with the previously stored data in the generated logged database 165 on the server side system. FIG. 4 illustrates one embodiment of a click reconciliation process in accordance with the present invention.

Initially, a set of unique advertisement identifiers, the publisher identifier, GUID_hashes, and URL_hash are processed 410 for each "click" (or selection or trigger) 415 from a collated click log file (or files). In one embodiment, processing includes the steps in 415 through 445 in a "for each" loop. The information is logged in the log database shown in, for example, FIG. 2. In addition, the process obtains access 425 to the validation log database 175 of valid unique advertisement identifiers, publisher identifiers, GUID_hashes, and URL_hash. In particular, the validation log database 175 provides a back-end statistics database that maintains a list of all valid unique advertisement identifier and GUID_hash pairs issued within a predefined rolling time period which is derived from the valid link tables of the generated log database 165 from the web servers.

By referring to the entries in the validation log database 175, the process determines 420 whether the unique advertisement identifier and the GUID_hash matches 420 an entry in the validation log database 175 (e.g., a "fingerprint"). In one embodiment, a "click token" from the validation log database is checked to determine if it corresponds to a valid unique advertisement identifier and GUID_hash entry in the generated log database.

If there is no match between the pairs of entries, the process logs 430 the invalid unique advertisement identifier, publisher identifier, and URL_hash click information into a database. The data can be structured for dissemination through a report function. If there is a match, i.e., the two entries are appropriately paired, the process determines 435 if the pair has already been counted. For example, the process determines if a link relating to advertising associated with the pair has already been served.

If the unique advertisement identifier and GUID_hash pair is valid (i.e., they match) and the link has not previously been served, the process (e.g., through a statistics server) logs (or counts) 445 the activation as a valid click for a revenue reporting perspective against the publisher identifier. If the unique advertisement identifier and GUID_hash pair is invalid, or this link has previously been served, the process logs 440 into a database, e.g., an invalid click table, information that includes the publisher identifier, click details, and time and date stamp of the invalid click.

The process monitors the invalid click database (or table) on a predetermined time (or periodic) basis to respond to occurrences of invalid clicks based on predefined thresholds. Based on the rules (e.g., user defined system pre-defined) governing the predefined threshold, the process executes pre-defined actions associated with the rules. For example, the rules can be structured so that when the predefined thresholds are exceeded a warning communication is transmitted to a machine that monitors transactions.

An advantage of the present invention includes providing additional information, e.g., an advertisement, in a manner that includes an identifier of that information and the URL of the web site with which it is associated so that when that information is selected it can be pair (or matched) with stored identifier data to determine whether the selection is "valid." Thus, the information is verifiable, or auditable, for applications that would benefit from such data, for example, advertisement providers or purchasers associated with content on a web site. Such data would then be used to identify whether clicks on a web site are fraudulent due to activity from, for example, a click harvesting mechanism.

Upon reading this disclosure, those of skill in the art will appreciate still additional alternative structural and functional designs for a system and a process for a system and a method for detecting and preventing fraud for online advertising through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of reconciliation of a selection of an advertisement to determine whether the selection is valid, the method comprising:
   (a) receiving, by a server, from a client a request to supplement content on a web page being viewed by a user, the request comprising a publisher identifier that identifies a publisher of a web site of the web page being viewed on the client and on which an advertisement is to be served;
   (b) identifying, by the server, for a response to the request the advertisement and a unique advertisement identifier for the advertisement;
   (c) generating, by the server, a unique advertisement view identifier and pairing the unique advertisement view identifier with the unique advertisement identifier to identify a single instance of serving the advertisement to the client;
   (d) storing, by the server, to a database the unique advertisement view identifier and the unique advertisement identifier;
   (e) transmitting, by the server, to the client the response comprising payload having executable code that includes a URL of a click handling page, the unique advertisement identifier and the unique advertisement view identifier;
   (f) receiving, by the server from the client, responsive to a pointer over event triggered by the client via a pointing device of the client moving a pointer over a link to the advertisement corresponding to the unique advertisement identifier, a page call to the click handling page and a query string comprising the unique advertisement identifier and the unique advertisement view identifier; and
   (g) determining, by the server, that the unique advertisement identifier and the unique advertisement view identifier received from the client match the unique advertisement view identifier and the unique advertisement identifier stored in the database that maintains a list of valid unique advertisement identifier and unique advertisement view identifier pairs issued within a predetermined rolling time period and that the link to the advertisement corresponding to the unique advertisement identifier has not been previously served.

2. The method of claim 1, wherein step (a) further comprises receiving by the server, from the client a referral uniform resource locator (URL) to identify the URL address of the web page to which the link to the advertisement is to be served.

3. The method of claim 1, wherein step (b) further comprises retrieving the unique advertisement identifier from an advertisement database.

4. The method of claim 1, wherein step (c) further comprises generating the unique advertisement view identifier for each unique web page and each unique advertisement identifier.

5. The method of claim 1, wherein step (d) further comprises storing to the database a publisher identifier, a referral URL and the unique advertisement identifier.

6. The method of claim 1, wherein step (d) further comprises storing to the database a publisher identifier and a hash of a referral URL.

7. The method of claim 1, wherein step (d) further comprises storing to the database a hash of the unique advertisement identifier.

8. The method of claim 1, wherein step (e) further comprises transmitting to the client a payload of the response comprising executable code to direct a browser of the client to the URL of the click handling page.

9. The method of claim 1, wherein step (e) further comprises transmitting to the client a payload of the response comprising executable code that comprises a set of unique advertisement identifiers and corresponding unique advertisement view identifier pairs.

10. The method of claim 1, wherein step (e) further comprises transmitting to the client a payload of the response comprising identification of the advertisement to be displayed.

11. The method of claim 1, wherein step (e) further comprises transmitting to the client a payload of the response comprising a hash of the unique advertisement view identifier instead of the unique advertisement view identifier.

12. The method of claim 11, wherein step (f) further comprises receiving from the client the hash of the unique advertisement view identifier instead of the unique advertisement view identifier.

13. A method of reconciliation of a selection of an advertisement to determine whether the selection is valid, the method comprising:
   (a) receiving, by a server, from a client a request to supplement content on a web page being viewed by a user, the request comprising a publisher identifier that identifies a publisher of a web site of the web page being viewed on the client and on which an advertisement is to be served;
   (b) identifying, by the server, for a response to the request an advertisement and a unique advertisement identifier for the advertisement;

(c) generating, by the server, a unique advertisement view identifier and pairing the unique advertisement view identifier with the unique advertisement identifier to identify a single instance of serving the advertisement to the client;

(d) storing, by the server, to a database the unique advertisement view identifier and the unique advertisement identifier;

(e) transmitting, by the server, to the client the response comprising a payload having executable code that includes a URL of a click handling page, the unique advertisement identifier and the unique advertisement view identifier;

(f) receiving, by the server from the client, responsive to a pointer over event triggered by the client via a pointing device of the client moving a pointer over a link to the advertisement corresponding to the unique advertisement identifier, a page call to the click handling page and a query string comprising the unique advertisement identifier and the unique advertisement view identifier; and (g) determining, by the server, that the unique advertisement identifier and the unique advertisement view identifier received from the client match the unique advertisement view identifier and the unique advertisement identifier stored in the database that maintains a list of valid unique advertisement identifier and unique advertisement view identifier pairs issued within a predetermined rolling time period; and (h) determining, by the server, that the link to the advertisement corresponding to the unique advertisement identifier has been previously served.

14. The method of claim 13, further comprising transmitting, by the server, responsive to the determination, a command to close a window of the browser.

15. The method of claim 13, further comprising determining, by the server, that the advertisement identifier and the advertisement view identifier pair received from the client are invalid.

16. The method of claim 15, further comprising storing, by the server, to the database information comprising the invalid advertisement identifier.

17. A system of reconciliation of a selection of an advertisement to determine whether the selection is invalid, the system comprising:

a server configured to:
receive from a client a request to supplement content on a web page being viewed by a user, the request comprising a publisher identifier that identifies a publisher of a web site of the web page being viewed on the client and on which an advertisement is to be served;

identify for a response to the request the advertisement and a unique advertisement identifier for the advertisement;

generate a unique advertisement view identifier and pairing the unique advertisement view identifier with the unique advertisement identifier to identify a single instance of serving the advertisement to the client;

store to a database the unique advertisement view identifier and the unique advertisement identifier;

transmit to the client a response comprising a payload having executable code that includes a URL of a click handling page, the unique advertisement identifier and the unique advertisement view identifier;

receive from the client, responsive to a pointer over event triggered by the client via a pointing device of the client moving a pointer over a link to the advertisement corresponding to the unique advertisement identifier, a page call to the click handling page and a query string comprising an advertisement identifier and an advertisement view identifier; and determine that the advertisement identifier and the advertisement view identifier pair received from the client do not match the unique advertisement view identifier and the unique advertisement identifier pair stored in the database that maintains a list of valid unique advertisement identifier and unique advertisement view identifier pairs issued within a predetermined rolling time and that the link to the advertisement corresponding to the unique advertisement identifier has been previously served.

18. The system of claim 17, wherein the server is further configured to determine that the link to the advertisement corresponding to the unique advertisement identifier has been previously served.

19. The system of claim 17, wherein the server is further configured to transmit, responsive to the determination, a command to close a window of the browser.

20. The system of claim 17, wherein the server is further configured to determine that the advertisement identifier and the advertisement view identifier pair received from the client are invalid.

21. The system of claim 17, wherein the server is further configured to store, responsive to the determination, to the database information comprising the invalid advertisement identifier.

* * * * *